United States Patent
Schlansker et al.

(10) Patent No.: US 9,584,373 B2
(45) Date of Patent: Feb. 28, 2017

(54) CONFIGURABLE CLOS NETWORK

(75) Inventors: Michael Schlansker, Los Altos, CA (US); Jose Renato G Santos, Morgan Hill, CA (US); Michael Renne Ty Tan, Menlo Park, CA (US); Guodong Zhang, Plano, TX (US); Shih-Yuan Wang, Palo Alto, CA (US); Jean Tourrilhes, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 220 days.

(21) Appl. No.: 14/398,579

(22) PCT Filed: May 1, 2012

(86) PCT No.: PCT/US2012/035918
§ 371 (c)(1),
(2), (4) Date: Nov. 3, 2014

(87) PCT Pub. No.: WO2013/165390
PCT Pub. Date: Nov. 7, 2013

(65) Prior Publication Data
US 2015/0110488 A1    Apr. 23, 2015

(51) Int. Cl.
| | |
|---|---|
| *H04L 12/24* | (2006.01) |
| *H04L 12/931* | (2013.01) |
| *H04L 12/933* | (2013.01) |
| *H04Q 11/00* | (2006.01) |

(52) U.S. Cl.
CPC .......... *H04L 41/14* (2013.01); *H04L 41/0813* (2013.01); *H04L 49/1515* (2013.01); *H04L 49/65* (2013.01); *H04Q 11/0005* (2013.01); *H04Q 11/0062* (2013.01); *H04Q 2011/0052* (2013.01); *H04Q 2011/0096* (2013.01)

(58) Field of Classification Search
CPC ....... H04Q 11/0005; H04Q 2011/0039; H04Q 11/0062; H04Q 11/0052; H04Q 2011/0015; H04Q 2011/0096; H04L 41/24; H04L 41/0813
See application file for complete search history.

(56) References Cited

U.S. PATENT DOCUMENTS

| | | | |
|---|---|---|---|
| 5,875,314 A * | 2/1999 | Edholm | H04Q 11/0478 370/386 |
| 6,658,177 B1 | 12/2003 | Chertkow | |
| 7,389,046 B1 | 6/2008 | Tanaka et al. | |
| 7,391,952 B1 | 6/2008 | Ugolini et al. | |
| 7,756,371 B1 | 7/2010 | Burnham et al. | |

(Continued)

FOREIGN PATENT DOCUMENTS

CN    101390023    3/2009

OTHER PUBLICATIONS

Extended European Search Report, EP Application No. 12876066.7, Date: Dec. 13, 2015, pp. 1-8.

(Continued)

*Primary Examiner* — Ted Wang
(74) *Attorney, Agent, or Firm* — Hewlett Packard Enterprise Patent Department

(57) ABSTRACT

A configurable Clos network includes leafs and spines and a switch fabric that connects the leafs and the spines. The switch fabric couples each leaf port of each leaf to at least one spine port of each spine.

13 Claims, 11 Drawing Sheets

(56) References Cited

U.S. PATENT DOCUMENTS

| | | | |
|---|---|---|---|
| 7,983,194 B1 | 7/2011 | Genetti et al. | |
| 8,060,682 B1 | 11/2011 | Genetti et al. | |
| 2002/0057862 A1* | 5/2002 | Okayama | G02B 6/32 385/17 |
| 2010/0097934 A1 | 4/2010 | Hendel et al. | |
| 2010/0254652 A1* | 10/2010 | Kirkpatrick | H04Q 11/0005 385/17 |
| 2010/0254703 A1 | 10/2010 | Kirkpatrick et al. | |

OTHER PUBLICATIONS

International Search Report and Written Opinion, International Application No. PCT/US2012/035918, Date: Dec. 20, 2012, pp. 1-9.

Farrington, N et al, "Data Center Switch Architecture in the Age of Merchant Silicon", 2009.

Xi, K et al, "Petabit Optical Switch for Data Center Networks", Research Paper.

\* cited by examiner

CONFIGURABLE CLOS NETWORK

BACKGROUND

Clos architectural features may be used to build large scale networks; i.e., a Clos network. A Clos network uses a multistage switching circuit. Clos networks are useful when the physical switching needs exceed the capacity of the largest feasible single crossbar switch. A further advantage of Clos networks is that the required number of crosspoints (which make up each crossbar switch) can be much fewer than were the entire switching system implemented with one large crossbar switch.

DESCRIPTION OF THE DRAWINGS

The detailed description will refer to the following drawings in which like numerals refer to like items, and in which:

FIGS. 1A-1D are schematic representations of aspects of a Clos network;

DETAILED DESCRIPTION

Figure 2:
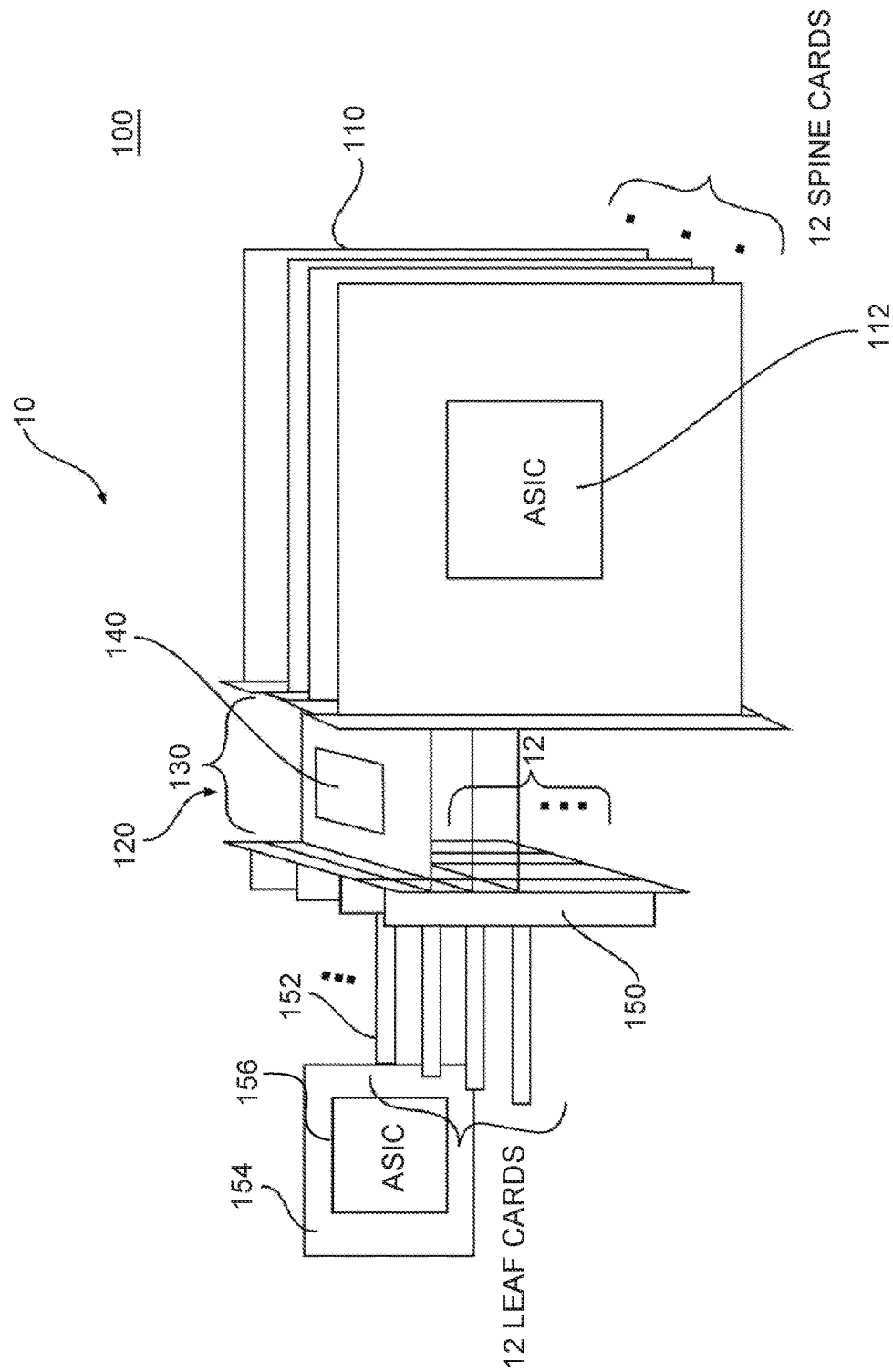
FIG. 2 is a perspective view of an embodiment of a section of a configurable Clos network.

After it is deployed, a large Clos network may require the addition of more network equipment including more compute racks or additional network switches. Traditional methods require substantial rewiring as new equipment is added.

Disclosed herein is a configurable Clos network that allows expansion or contraction of compute and networking equipment using circuit switch reconfiguration and without rewiring existing network cables. The herein disclosed configurable Clos network uses small-scale, programmable and bi-directional circuit switches to connect spine and leaf cards. In an example, the switches are optical switches. In another example, the switches are electrical switches. Because they are much smaller than current Clos switches, the herein disclosed switches are inexpensive and easy to fabricate, install, and program, thereby providing significant advantages over larger Clos switches. Furthermore, because, as is disclosed below, the configurable Clos network uses many of these small-scale switches, programming the switches so that available spine and leaf ports are used is facilitated. The herein disclosed configurable Clos network is more efficient than existing Clos networks at least because it may make full use of leaf and spine connections, as will be described below.

As used herein, a leaf, leaf switch, or leaf card, refers to a connections to hosts. A host may be a computer system with a network interface controller (NIC) that connects to the leaf switch port. A storage device also has a NIC that connects to a leaf and allows the storage device to communicate with a host. A spine (or fabric), spine switch, or spine card, interconnects leaf switches together and allows communications between leaf switches.

One specific use of the configurable Clos network is in a large scale datacenter, and if the datacenter is large enough, more than one such Clos network may be deployed. Datacenters are traditionally built using separately optimized host racks and core switches. The configurable Clos network can optimize the entire datacenter, thereby decreasing installation and maintenance costs and increasing flexibility for future expansion of the datacenter. Moreover, datacenter networks are, ideally, customized for specific customer needs including number of hosts, access bandwidth, QoS, availability and other factors. Datacenters commonly require multiple networks, such as networks for: primary and failover, production and research, control and data, LAN and SAN, or interactive and batch. These multiple network requirements may necessitate complex planning and on-site customization as network components are purchased and cabled for specialized needs. Customized networks are difficult to rewire with evolving scale and needs. While logical topologies are complex and configuration dependent, physical connectivity ideally should remain simple and independent of configuration. For example, cabinets may be connected using low cost future proof cables with easy installation and replacement.

Clos networks are also used to build large port count core switches using smaller port count switch ASICs. The disclosed configurable Clos network may be used to allow the modular addition of leaf cards to provide additional network ports and spine cards to provide additional network bandwidth in such core switches.

The configurable Clos network addresses the design issues in a large-scale datacenter by using circuit switching. The configurable Clos network provides configurable interconnect topologies to solve at least two key problems. First, non-configurable interconnects lose performance when a subset of leaf cabinets and spine cards are installed. For example, when half of leafs and spines are installed on a Clos network, half of leaf ports connect to missing spines, and half of spine ports connect to missing leafs. Second, circuit switching enables partitioning of hardware implementing redundant networks for fault tolerance as well as independent networks for heterogeneous traffic segregation. Fault tolerance requires careful topology design to assign ports to fault zones as the number of cabinets and spine cards is varied. Independent networks can be used, for example, to segregate lossless SAN traffic from lossy LAN traffic, or to overcome current ASIC limitations and lack of management software needed for converged fabric networks. Naive circuit switch systems use a full crossbar for flexibility in connecting top-of-rack (TOR) uplinks to spines. Such solutions are expensive, however. To reduce cost, the herein disclosed configurable Clos network uses multiple small-scale optical switches (for example, 48 12-port switches to interconnect 576 TOR switch ports).

Figures 1A, 1B, 1C, 1D:
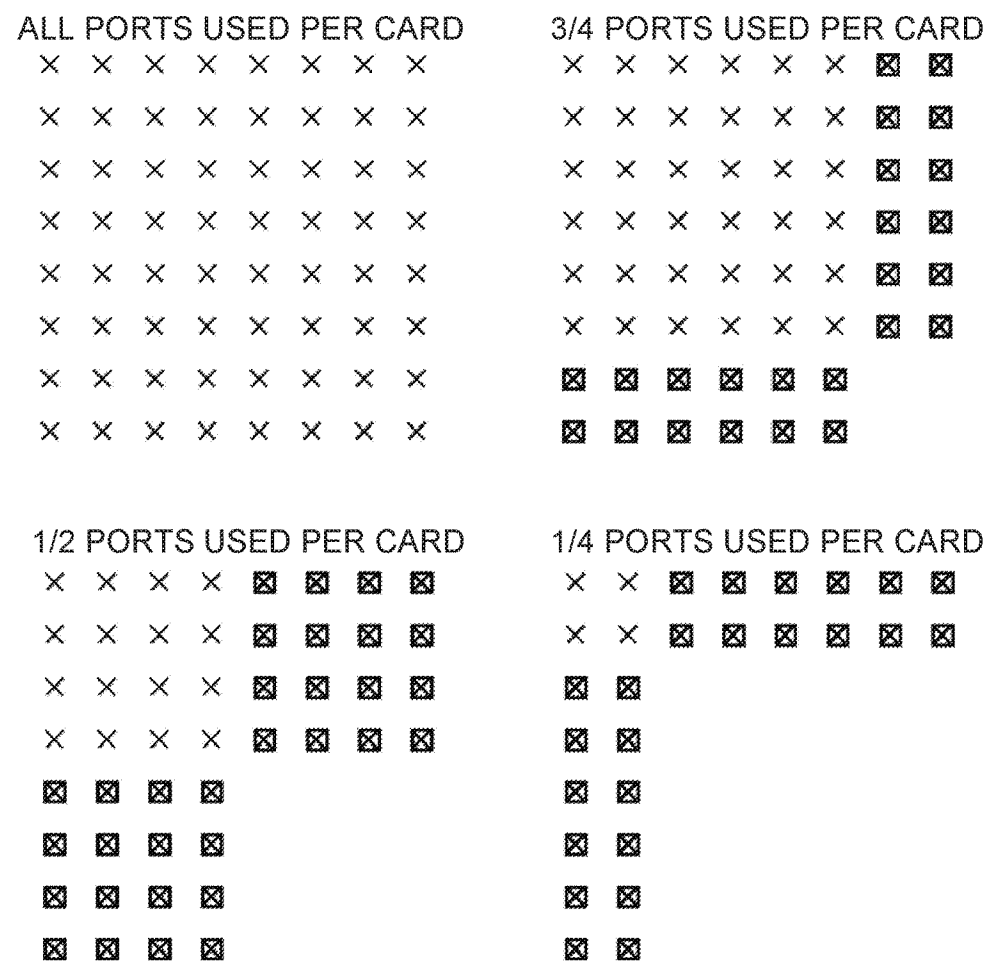

FIGS. 1A-1D are schematic representations of aspects of a hypothetical Clos network. FIG. 1A is a schematic representation of the connections among 8 leaf cards and 8 spine cards in a hypothetical Clos network. The connection illustrated is between eight, 8-port, spine cards (the columns) and eight, 8-port leaf, cards (the rows). Each "X" in FIG. 1A represents a connection between the spines and the leafs, and there are 64 connections. As can be seen in FIG. 1A, all eight ports of the spine cards and all eight ports of the leaf cards are used.

FIG. 1B is a schematic representation of connections between 4 leaf cards and 4 spine cards in the hypothetical Clos network where the same 8-port spines and leaf cards of FIG. 1B are connected. The connections are represented by an "X" and the unused ports by a square. As can be seen in FIG. 1B, only 4 ports per card are used, and 4 ports of the spine cards and 4 ports of the leaf cards are unused. These unused connections waste hardware resources and result in lowered bandwidth per connection compared to the bandwidth per connection when all ports are connected.

FIG. 1C illustrates a 6×6 connection where ¾ of the available ports on each of the cards are used. FIG. 1D illustrates a 2×2 connection where ¼ of the ports on each of the cards are used. Thus, the connections shown in FIGS. 1B-1D are inefficient in that available hardware is going unused, and result in lower bandwidth per connection.

The configurable Clos network addresses the problems illustrated in the connections of FIGS. 1B-1D. In addition, the disclosed configurable Clos network provides for enhanced flexibility in connecting Clos components (i.e., spine and leaf cards) over the connections shown in the hypothetical Clos network of FIGS. 1A-1D.

More specifically, the configurable Clos network provides for connecting each port of each leaf card to each spine card no matter how many spine cards and leaf cards are used in the network. The configurable Clos network uses a small-scale, programmable optical switch arrangement in a switch fabric to bi-directionally connect the spine cards and the leaf cards. The disclosed switch fabric allows each unused port in each leaf and each unused port in each spine shown in FIGS. 1B-1D to be connected to a corresponding spine and leaf, respectively.

The spine and leaf card configurations disclosed below apply to varying numbers of leaf and spine cards. Using a number of the disclosed small-scale switches, the configurable Clos network allows for the even distribution of leaf traffic onto spine cards for each of these configurations. Similarly, spine cards may be provisioned across separate networks of arbitrary bandwidth as needed by a customer application. Leaf and spine card numbers need not correspond. For example, a full complement of 24 leaf ASICs can be load balanced across only 8 out of a full complement of 12 spines with bandwidth added as needed in a cost proportional manner. Partial hardware configurations often result in irregular networks. For example, if 12 uplinks from one leaf are evenly distributed across 5 spines, the leaf has 3 connections to 2 spines and 2 connections to 3 spines.

FIG. 2 is a perspective view of an embodiment of a section of a configurable Clos network in which small-scale, programmable switches are used for bi-directional signaling or communications between spine cards and leaf cards. In an embodiment, the section of the configurable Clos network is structured so that a multitude of leaf cards are arranged with each leaf card coupled to each of a multitude of interconnects, and each of the interconnects in turn is coupled to each of a multitude of spines.

Figure 10:
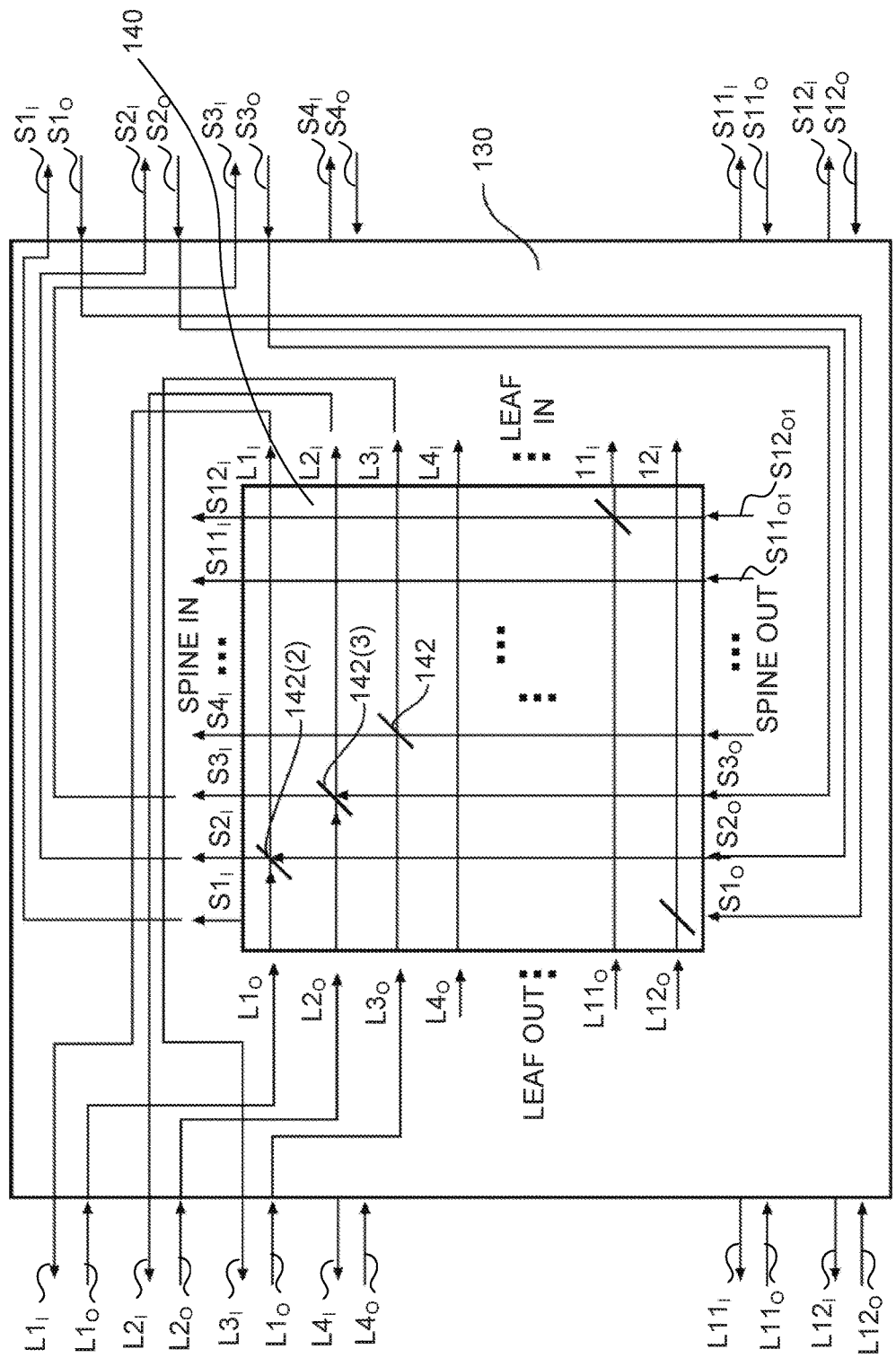
FIG. 10 illustrates an embodiment of a programmable switch used with the configurable Clos network of FIG. 2.

In FIG. 2, section 100 of configurable Clos network 10 includes spine cards 110 that are connected to leaf connections 150 by a switch fabric 120 that includes substrates 130 on which are formed small-scale, programmable circuit switches 140. In an embodiment, the circuit switches 140 are electrical switches. In another embodiment, the circuit switches 140 are optical switches. FIG. 10 illustrates an embodiment of such an optical switch. The section 100 shown in FIG. 2 may be repeated to form a complete central cabinet structure for the configurable Clos network 10. However, for ease of illustration, only one section 100 is shown. Furthermore, the spine cards 110 may be placed in a spine rack and the leaf cards 154 in separate leaf racks. Leaf card ASICs may be connected to host computers or other devices that communicate through the configurable Clos network. Illustration of these structures and devices is not necessary to explain the operation and function of the configurable Clos network, and so they are omitted from FIG. 2.

In FIG. 2, four spine cards 110, three substrates 130, three circuit switches 140, and four leaf connections 150 are illustrated. Each leaf connection is coupled to a corresponding leaf card 154 with 12 bidirectional optical fibers 152. Each leaf card 154 has formed thereon an ASIC 156. Each of the 12 substrates 130 has an signal path through the connection and through one of the bi-directional fibers 152 to a distinct leaf ASIC port. However, as will be discussed with respect to FIGS. 5-9, the section 100 includes twelve of each of the cards, substrates, connections and switches, and fewer are shown for ease of illustration. Furthermore, the section 100 is not limited to a 12×12 matrix, and more or fewer cards, substrates, connections and switches may be used. Still further, in the section 100 of the configurable Clos network 10, the number of spine cards 110 and leaf connections 150 and leaf cards 154 do not have to be equal, as will be explained with respect to FIGS. 5-9. Yet further, the section 100 may be constructed with 12 leaf connections 150 and 12 leaf cards 154, and 12 spine cards 110, but more than 12 substrates 130 and circuit switches 140. For example, the section 100 may be constructed with 24 such substrates 130 and circuit switches 140. Even further, in an embodiment, the section 100 may include 12 spine cards with a subsection of 12 leaf cards, 12 leaf connectors, and 12 interconnects 130 with circuit switches 140 replicated any number of times (i.e., the 12 spine cards 110 each connects to many more than 12 interconnects 130).

As can be seen in FIG. 2, the spine cards 110, leaf connections 150, and leaf cards 154 are parallel to each other, and the connection between the spine cards 110 and leaf connections 150 is by way of substrates 130 with their associated small-scale, programmable circuit switches 140, and with the substrates 130 positioned orthogonal to the cards 110 and connections 150.

In an embodiment, because there are twelve each of the cards 110 and connections 150, the section 100 includes twelve substrates 130, each of which has formed thereon a 12×12 small-scale, programmable optical switch 140 that provides bi-directional signaling between the spine cards 110 and the leaf connections 150. However, as noted above, the section 100 may include twice as many switches 140 and substrates 130 as there are spine cards 110 and leaf cards 154. In general, the number of substrates 130 is chosen to match at least the number of ports on a card edge.

In an embodiment, the substrates 130 are plastic, silicon, or other suitable material on which are formed optical pathways or fibers to optical circuit switches 140. Alternately, the substrates 130 are printed circuit boards with electrical pathways or wires to electrical circuit switches 140 formed on the printed circuit boards.

Finally, the spine cards 110 have formed thereon ASICs 112, and the leaf connections 150 are connected to the leaf cards 154 (which may include ASICs 156) by way of cables 152. The cables 152 may be high-bandwidth optical fibers or electrical cables. The bandwidth may be 40 GB per second or more. The ASICs 112 and 156 may be Ethernet ASICs.

Figure 3:
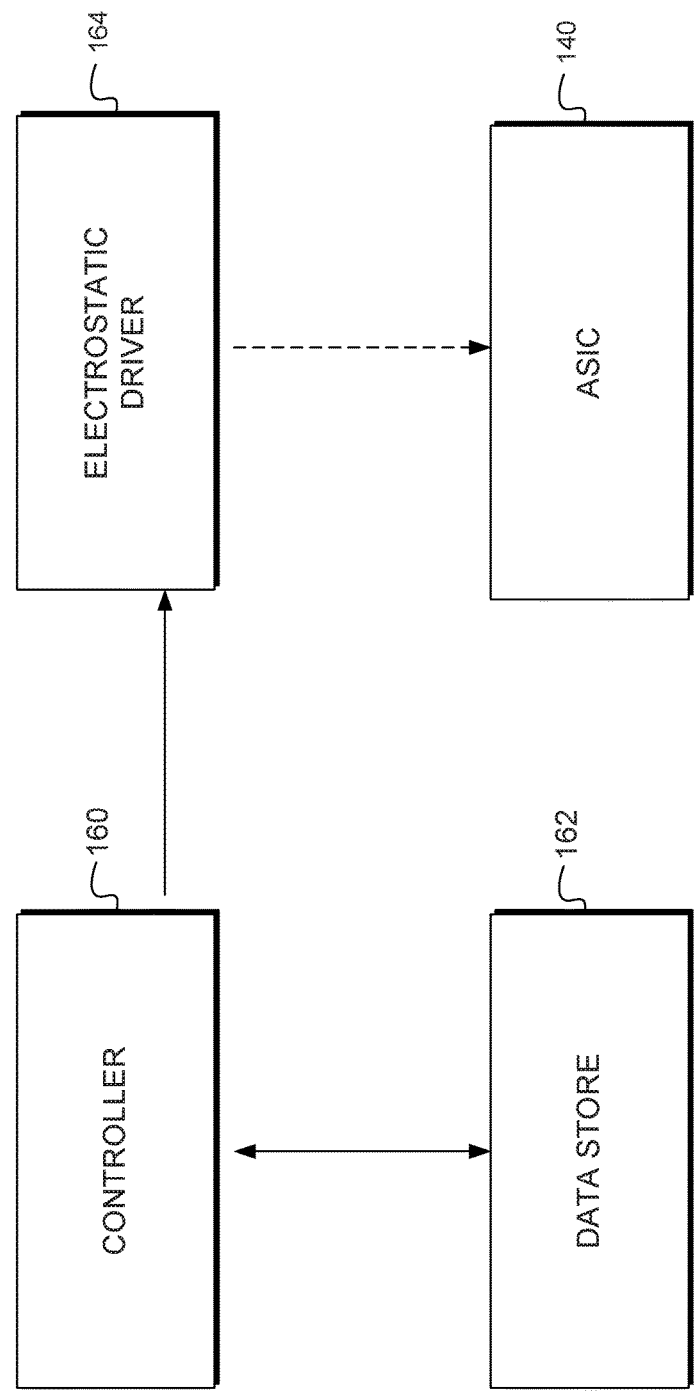
FIG. 3 illustrates a control system embodiment for the configurable Clos network of FIG. 2.

Configuration of the configurable Clos network may be controlled by operation of the switches formed on substrates positioned between the leaf connections and the spine cards. FIG. 3 illustrates an control system embodiment for the configurable Clos network of FIG. 2. The circuit switches 140 may be controlled or operated by controller 160, which executes programming code stored in data store 162 to operate the switches 140 to open or close a signal path in the switch fabric 120. In an alternative, the controller executes programming to activate or deactivate electrostatic devices 164 to open and close optical signal paths in the switch fabric 120. The optical switches may be implemented with moveable mirrors (see FIG. 10), and the controller 160 may control the electrostatic devices 164 to position the moveable mirror.

The programming code executed by the controller 160 may cause the controller 160 to determine the number of installed leaf and spine cards and thus the number of available leaf and spine ports. The controller 160 then may execute machine instructions of the programming code to align a maximum number of bi-directional signal paths between the leafs and spines that are connected to the switch fabric 120 of the configurable Clos network. Alternately, the controller 160 may execute machine instructions to remove a leaf or spine that has a failed component from connection in the switch fabric 120.

The circuit switches may have 12 bidirectional 20 Gb/s data ports. Two 12×12 circuit switch cards are used to switch 40 Gb/s lanes. The vertical stack of 48 circuit switches provides 11.5 terabits of configurable bandwidth. The configurable Clos network as implemented in a datacenter reduces cost and increases flexibility when compared to a conventional (i.e., non-configurable) datacenter. A first savings results from the small-scale optical switches, which are much less expensive than large fullcrossbar optical switch. A second savings results from improved modular expandability. Without configuration capability, full use of potential bandwidth requires a full complement of spines even when the number of host cabinets and leafs is reduced. With configuration, the number of spines may be reduced in proportion to the number of host cabinets. Oversubscribed configurations are supported by further reducing the number of spines in proportion to the oversubscription factor. A third savings results from the spine cabinet's ability to deploy components across multiple networks. For example, while traditional networks require separate spare spines for LAN and SAN fail-over, with the herein disclosed configurable Clos network, one spare spine may be shared between LAN and SAN failover functions. Finally, important savings result from reduced deployment cost as many of the complexities of traditional physical customization are performed by programming the configurable Clos network.

FIGS. 4A-4D illustrate a programming embodiment for the configurable Clos network of FIG. 2. The example programming shown in FIGS. 4A-4D is based on a configurable Clos network having four, 4-port, spine cards and four, 4-port, leaf cards. Four cards with four ports each are used for ease of illustration. FIGS. 4A-4D illustrate a top-down, simplified schematic view of a connection segment of the configurable Clos network. In each of FIGS. 4A-4D, the spine cards and leaf cards are numbered 0-3. The spine cards and leaf cards are connected by a substrate having formed thereon a programmable switch ASIC. FIG. 10 illustrates an example of a programmable switch ASIC that may be programmed according to FIGS. 4A-4D.

Figure 4A:
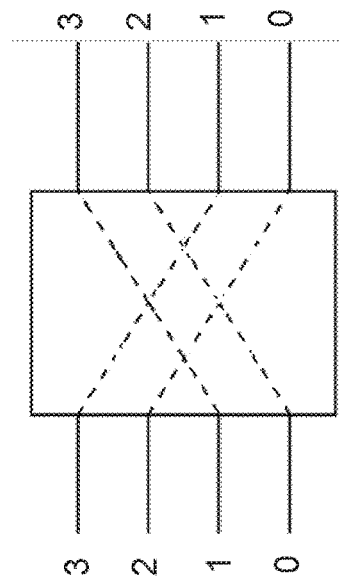
FIGS. 4A-4D illustrate a programming embodiment for the configurable Clos network of FIG. 2.

FIG. 4A illustrates the programmed connections at the 0th layer of a segment of a configurable Clos network. The leaf cards are designated 0-3, the spine cards 0-3, and the interconnect substrate and switch ASIC is designated as 0. However, these designations are purely arbitrary. For simplicity of illustration, some details of the connection of the interconnect substrate and switch ASIC are omitted; however, FIG. 4A is sufficient to illustrate programming of the 0th switch ASIC.

As can be seen in FIG. 4A, port 0 of the 0th leaf card is bi-directionally coupled to port 0 of the 0th spine card, with the dashed lines within the boundaries of the interconnect substrate and switch ASIC representing the signal paths between the leaf cards and the spine cards. Similarly, the 0th ports of the leaf cards 1, 2, and 3 are coupled, respectively, to the 0th ports of the spine cards 1, 2, and 3.

Figure 4B:
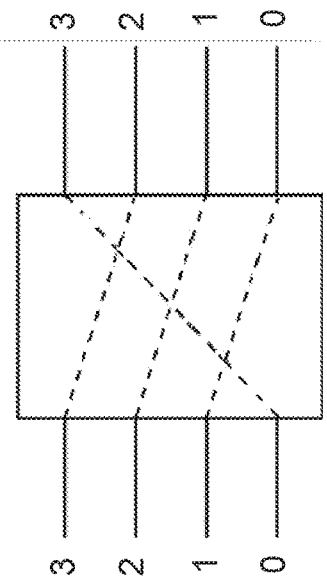

FIG. 4B illustrates an example of programming of the 1st switch ASIC. As can be seen, the 1st port of the 0th leaf card is coupled to the 1st port of the 1st spine card, the 1st port of the 1st leaf card is coupled to the 1st port of the 2nd spine card, the 1st port of the 2nd leaf card is coupled to the 1st port of the 3rd spine card, and the 1st port of the 3rd leaf card is coupled to the 1st port of the 0th spine card.

Figure 4C:
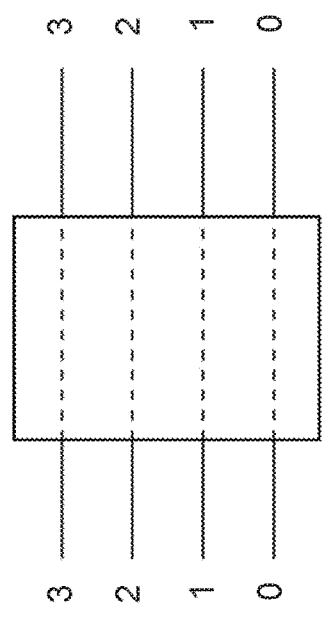

FIG. 4C illustrates an example of programming of the 2nd switch ASIC. As can be seen, the programmed signal paths between the 2nd ports of the leaf and spine cards are shifted by one compared to the programmed signal paths of FIG. 4B.

Figure 4D:
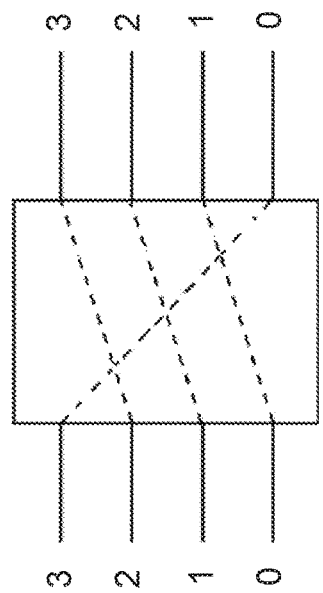

FIG. 4D illustrates an example of programming of the 3rd, and last, switch ASIC. As can be seen, the programmed signal paths between the 3rd ports of the leaf and spine cards are shifted by one compared to the programmed signal paths of FIG. 4C.

Thus, FIGS. 4A-4D illustrate an example of switch ASIC programming in which each port of the leaf cards is coupled at least once to each spine card, and each port of the spine cards is coupled at least once to each leaf card. This signal path shifting may be accomplished using the example mechanisms shown in FIG. 10. The signal path shifting may provide a somewhat uniform distribution of signals between leaf and spine cards.

The example programming shown in FIGS. 4A-4D is summarized in Table I.

TABLE I

| INTERCONNECT | LEAF-PORT | SPINE-PORT |
|---|---|---|
| 0 | 0-0 | 0-0 |
|   | 1-0 | 1-0 |
|   | 2-0 | 2-0 |
|   | 3-0 | 3-0 |
| 1 | 0-1 | 1-1 |
|   | 1-1 | 2-1 |
|   | 2-1 | 3-1 |
|   | 3-1 | 0-1 |
| 2 | 0-2 | 2-2 |
|   | 1-2 | 3-2 |
|   | 2-2 | 0-2 |
|   | 3-2 | 1-2 |
| 3 | 0-3 | 3-3 |
|   | 1-3 | 0-3 |
|   | 2-3 | 1-3 |
|   | 3-3 | 2-3 |

FIGS. 5-9 illustrate programming embodiments for the configurable Clos network of FIG. 2. Each spine card has 12 ports, and each leaf card has 12 ports. In the absence of the herein disclosed programming and corresponding programmable switches, only when 12 spine cards and 12 leaf cards are installed are all available ports coupled, and all available hardware ports are used.

Figure 5:
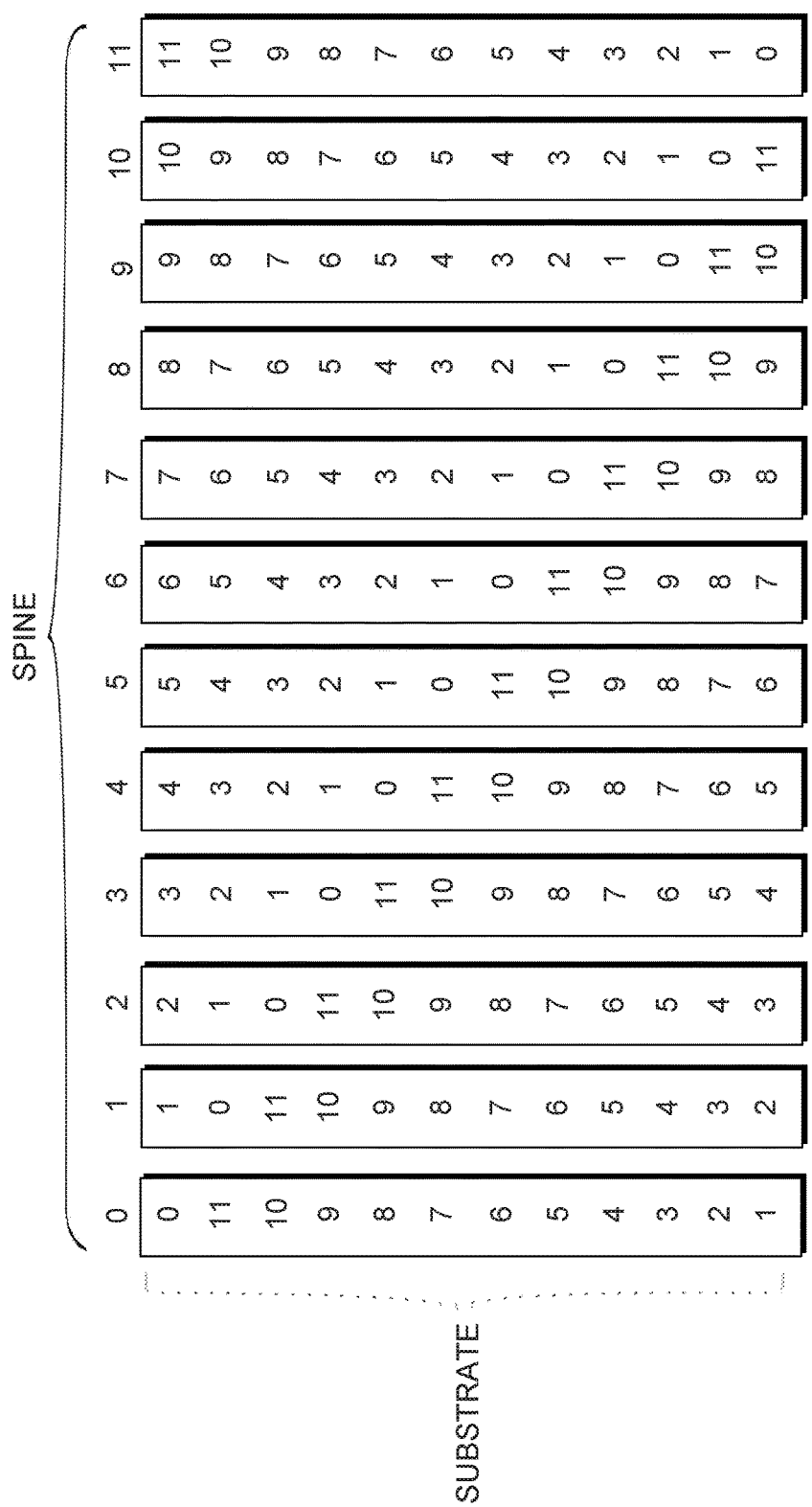
FIGS. 5-9 illustrate programming embodiments for the configurable Clos network of FIG. 2.

In FIG. 5, the spine cards 110s are represented by the columns, and the substrates 130/switches 140 are represented by the rows. Thus, in a 12×12 switch fabric, there would be twelve switches 140, which are represented by rows 0-11, and labeled as substrate. Thus, as can be seen in FIG. 5, each crossover between a column and a row represents a connection, and each such connection is given a number, from 0 to 11. Thus, row 0, column 0 has a number 0 registered, meaning the first port of the first connector 150 (and by extension the first leaf card 154) connects to the first port of the first spine card 110. In terms of the previously described numbering scheme, the 0th port of the 0th connector 150 (and by extension, the 0th leaf card) connects to the 0th port of the 0th spine card (and vice versa, since the connection paths are bi-directional). Thus, the programming illustrated for the 0th switch 140 provides for straight-through programming. Following row 0 (i.e., the first row) row 1 has the port shifted by one, such that spine card 0 (the first spine card) is the output connection to connector 11 (and leaf card 11 (the twelfth leaf card)). The process of shifting connections by one with each succeeding row proceeds until all the optical switch positions are programmed for all rows. Thus, the numbers 0-11 represent the programming of the Clos switch. The effect of the programming shown in FIG. 5 is that each port of each spine card connects to each leaf card at least once, and no spine card port is connected more than once to a specific leaf card. Conversely, each port of each leaf card connects to each spine card at least once, and no leaf card port is connected more than once to a specific spine card. Moreover, the programming provides for uniformly distributed signaling with all hardware fully utilized and no unutilized spine or leaf ports.

Figure 6:
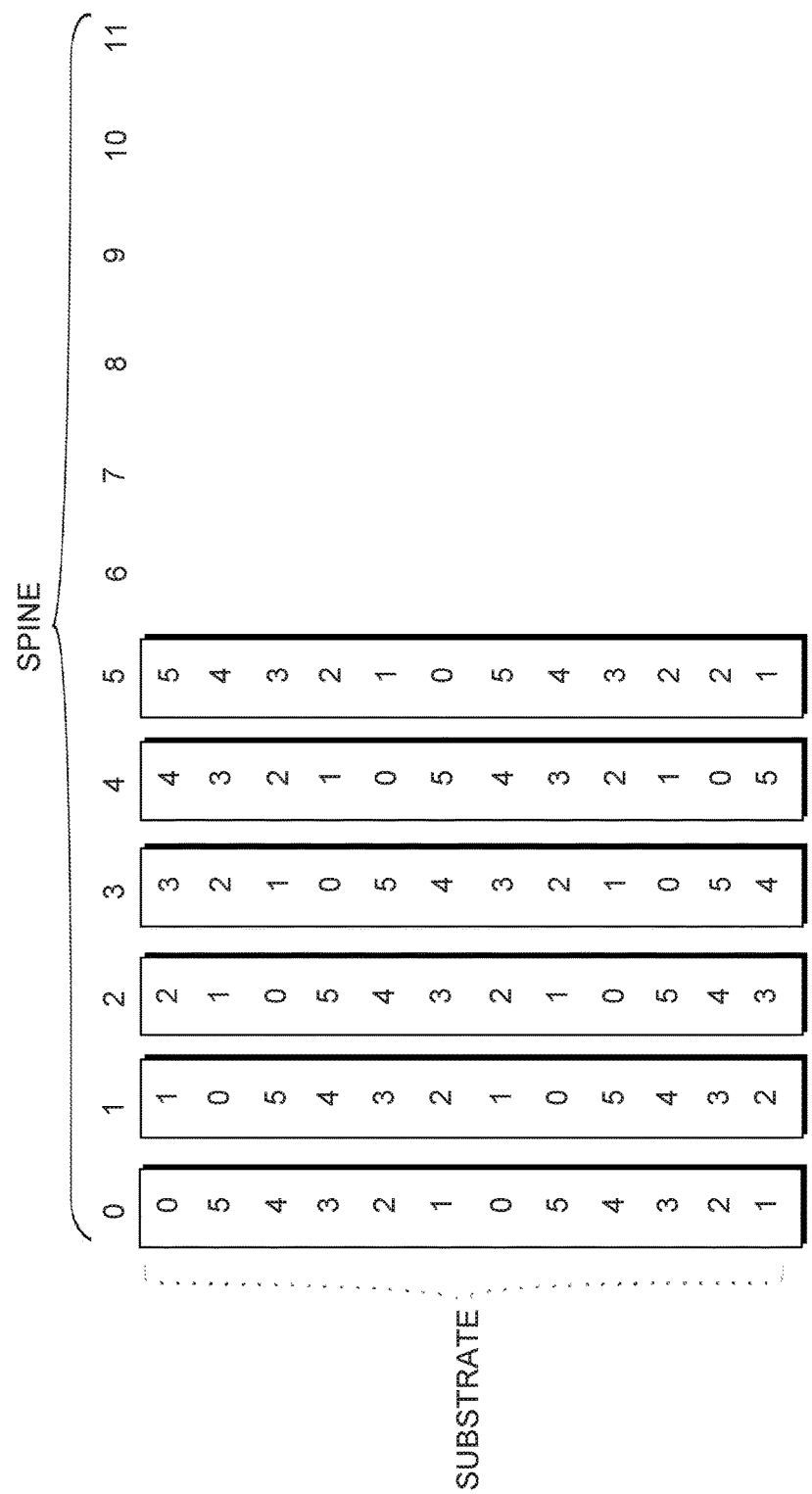

FIG. 6 illustrates a programming scheme when only six spine cards and six leaf cards are installed. In FIG. 6, the programmable switch ensures that all available ports are in fact used, even though the number (6 each) of spines and leafs is less than the maximum number (12) of spines and leafs. As can be seen in FIG. 6, spine card 0 connects to leaf card 0 twice (the 0 at position A and the 0 at position B). In fact, each spine card has exactly two connections to each of the leaf cards. Thus, with the programming of FIG. 6, all the hardware ports of each spine card and each leaf card are used. In addition, because there are two connections between each spine card port and each leaf card port, the available bandwidth over the two connections is higher than if only one connection is made.

Figure 7:
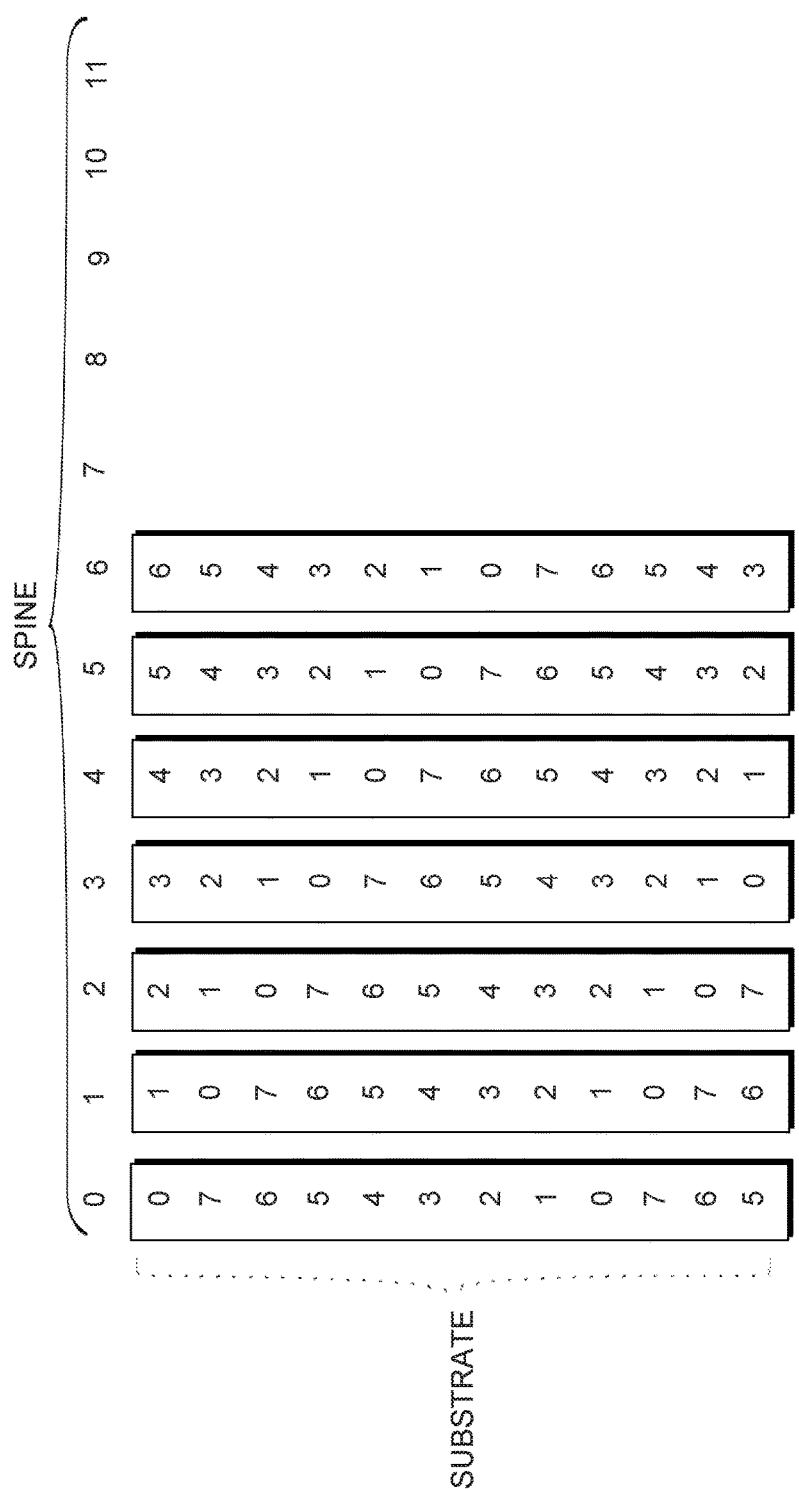

FIG. 7 illustrates an alternate programming scheme that may be used when the configurable Clos network is configured with eight spine cards and eight leaf cards. The 12 inputs or uplinks available on each leaf card now are distributed over 8 spine cards. As can be seen in FIG. 7, row (switch 140(0)) 0 is programmed to 0-7, row 1 (switch 140(1)) is programmed to 7-6, and so on. The result is that each leaf card has four single and four double connections to the spine cards. The left most, or 0th, leaf card is connected twice to the 0th, 7th, 6th, and 5th spine cards, and once to the 4th, 3rd, 2nd, and 1st spine cards That is, spine card 0, for example, is connected twice input ports 0, 7, 6, and 5, and once at ports 4, 3, 2, and 1. Although the programming illustrated in FIG. 7 results in a non-symmetric switch fabric, all of the available ports of the leafs and spines are connected and used.

Figure 8:
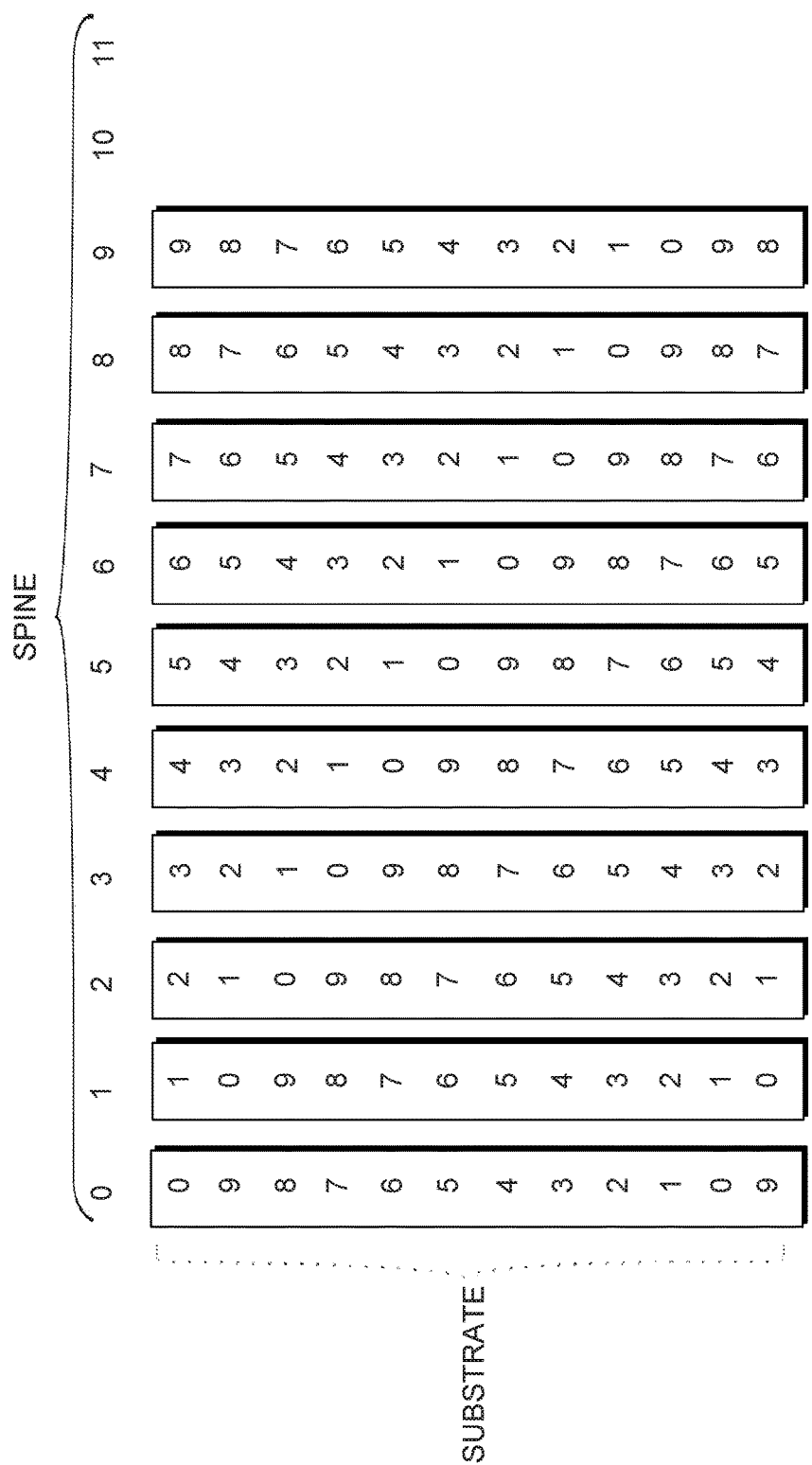

FIG. 8 illustrates an alternate programming scheme that may be implemented when the configurable Clos network is configured with 12 leaves and 10 spines. In FIG. 8, row 0 is programmed 0-9, row 1 is programmed 9, 0, 1, . . . 8, row 2 is programmed 8, 9, 0, 1, 2 . . . 7, and so on. The result is that each leaf has 8 single and 2 double connections to the spines.

Figure 9:
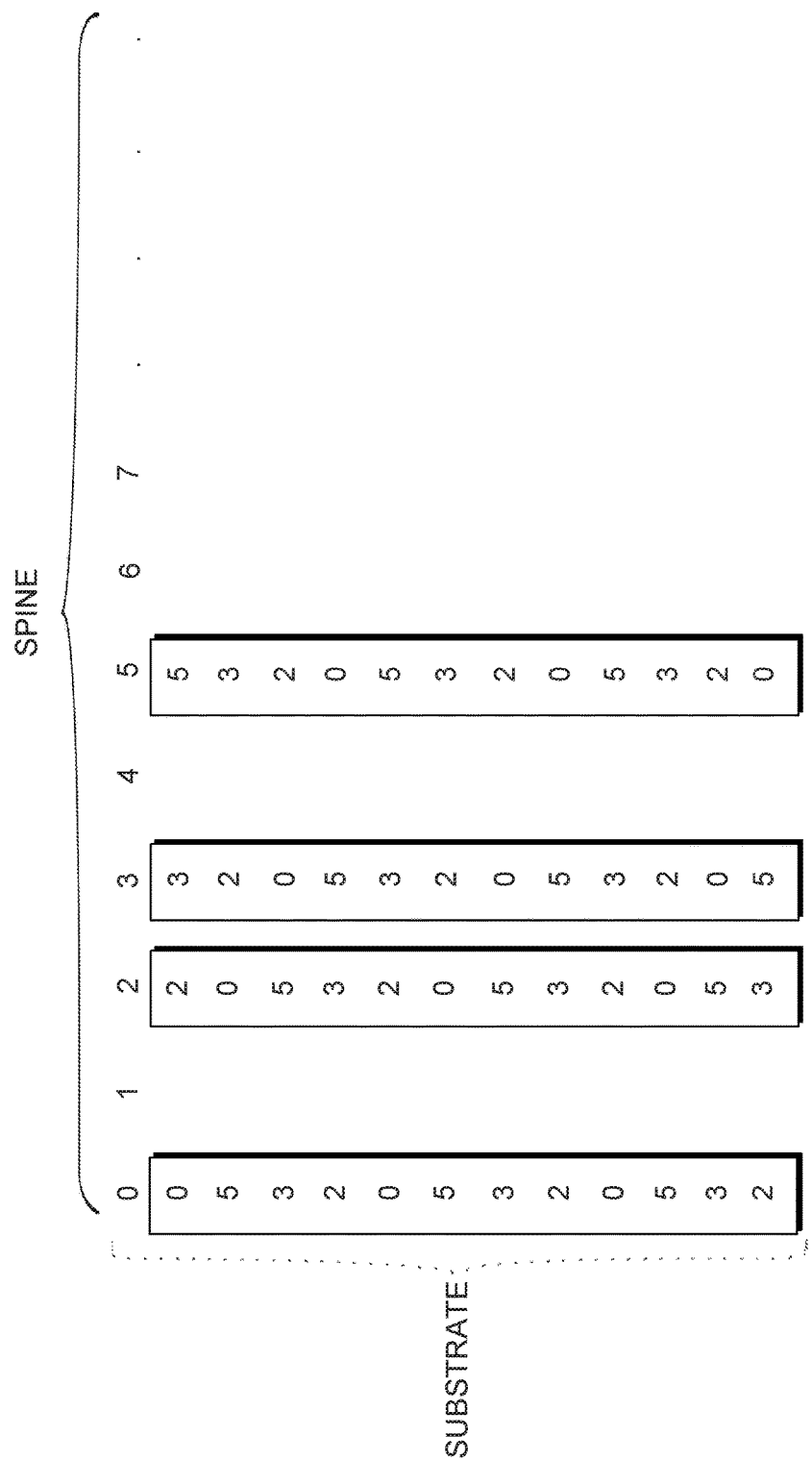

FIG. 9 illustrates the programming scheme that may be implemented when four leaf cards and four spine cards are installed, but without the four spine cards being installed in fill order. That is, the four leaf cards occupy positions 0, 2, 3, and 5, and positions 1, 4, and 6-11 are empty of leaf cards.

In FIG. 9, leaf row 0 is programmed 0, 2, 3, and 5; leaf row 1 is programmed 5, 0, 2, and 3, and so on. Thus, in the arrangement of FIG. 9, each leaf has 4 triple connections to the spines. The example of FIG. 9 shows connectors (leaf cards) occupying the same location numbers as the spines, although such an arrangement between connectors and spines is not necessary.

FIG. 10 illustrates an embodiment of a programmable circuit switch used with the configurable Clos network of FIG. 2. In FIG. 10, small-scale programmable optical switch 140 is implemented as an ASIC on substrate 130. The switch 140 uses moveable, two-sided mirrors 142 that are positioned to route signals between leaf outputs and spine inputs, and spine outputs and leaf inputs, by changing the signal path 90 degrees. The mirrors 142 are angled 45 degrees relative to a path between the outputs and the inputs, and are moveable along this inclined position. The mirrors are positioned in one position using a positive electrostatic force, and in the other position by a negative electrostatic force. For ease of illustration, FIG. 10 shows the connections for two leaf cards and two spine cards leaf cards (L1 and L2 and spine cards S2 and S3). Mirrors 142(2) and 142(3) are positioned to route the signals from the respective cards. Thus a signal arriving at L10 (leaf out) is diverted by mirror 142(2) to $S2_I$ (spine in) and a signal arriving at $S2_O$ (spine out) is diverted by mirror 142(2) to $L1_I$ (leaf in), for example.

Using the arrangement of moveable mirrors 142 shown in FIG. 10, any output from a leaf (that is, from any $LN_O$) can be routed or directed to any spine input (that is, to any $SN_I$).

The embodiment shown in FIG. 10 is one example of a programmable circuit switch, and other circuit switch may be used to route signals between the leafs and spines. For example, a switch similar to that shown in FIG. 10 can use fixed, two-sided mirrors that are "turned on" to divert a signal path from straight line to 90 degrees, rather than using moveable, two-sided mirrors. In another alternative, instead of a single substrate 130 with its switch ASIC 140, two substrates, each with one-way switch ASICs, could be used.

Figure 11:
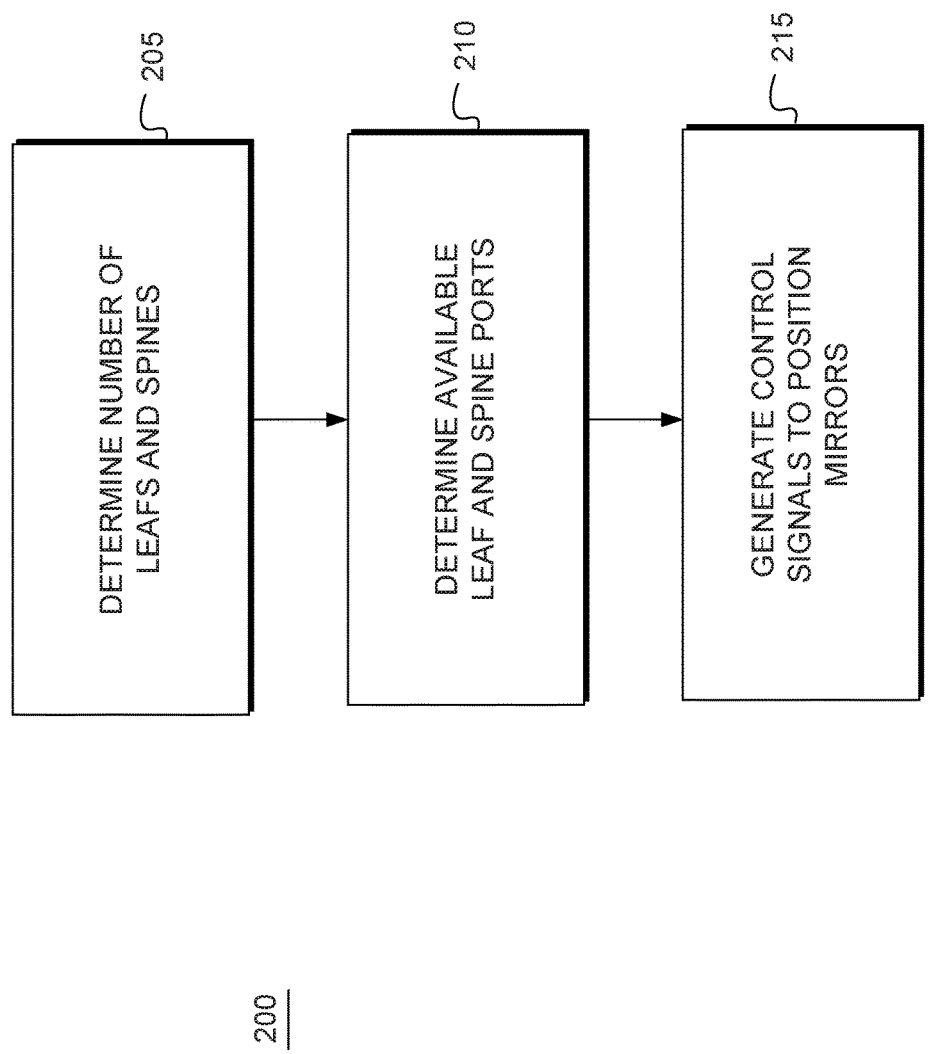
FIG. 11 is a flow chart Illustrating an example of a method for configuring a Clos network.

FIG. 11 is a flow chart illustrating an example of a method for configuring a Clos network. In FIG. 11, method 200 begins at block 205 when switch controller 160 determines a number of leafs and a number of spines connected to the switch fabric. In block 210, the controller 160 determines a number of available leaf and spine ports. In block 215, the controller 160 generates control signals to position the mirrors 142 to provide form a maximum number of leaf-spine optical connections. Method 200 then ends.

We claim:

1. A reconfigurable Clos network, comprising:
    a plurality of spines, each of the spines having a plurality of spine ports;
    a plurality of leafs, each of the leafs having a plurality of leaf ports; and
    a plurality of interconnects connecting the spines and the leafs, each of the interconnects comprising:
        a programmable circuit switch, the circuit switch between the spine ports and the leaf ports, the circuit switch comprising:
        a plurality of spine inputs;
        a plurality of spine outputs;
        a plurality of leaf inputs;
        a plurality of leaf outputs, wherein the circuit switch operates to transport data between the spine ports and the leaf ports,
        wherein the circuit switch comprises an optical switch, and wherein the optical switch comprises two-sided moveable mirrors, wherein in a first position, a movable two-sided mirror directs a first signal from a leaf output to a spine input and a second signal from a spine output to a leaf input.

2. The configurable Clos network of claim 1, further comprising a plurality of leaf connectors, each of the leaf connectors coupled to a corresponding one of the plurality of leafs, wherein each leaf is coupled to each of the interconnects, and wherein each of the interconnects is coupled to each of the spines.

3. The reconfigurable Clos network of claim 1, wherein the circuit switch comprises an electrical switch.

4. The reconfigurable Clos network of claim 1, wherein:
a number of leaf ports is less that a number of leafs and a number of spines equals the number of leafs.

5. The reconfigurable Clos network of claim 4, wherein the circuit switch couples each of the ports of each of the leafs to a port of each of the spines and couples each of the ports of each of the spines to a port of each of the leafs.

6. The reconfigurable Clos network of claim 1, wherein:
a number of leaf ports equals a number of leafs and a number of spines equals the number of leafs.

7. The reconfigurable Clos network of claim 5, wherein the circuit switch couples each of the ports of each of the leafs to a port of each of the spines and couples each of the ports of each of the spines to a port of each of the leafs.

8. A reconfigurable Clos network, comprising:
leafs;
spines;
a switch fabric that connects the leafs and the spines, wherein the switch fabric couples each leaf port of each leaf to at least one spine port of each spine,
wherein the switch fabric comprises an optical switch, and
wherein the optical switch comprises two-sided moveable mirrors,
wherein in a first position, a movable two-sided mirror directs a first signal from a leaf output to a spine input and a second signal from a spine output to a leaf input.

9. The reconfigurable Clos network of claim 8, wherein the switch fabric comprises a plurality of interconnect substrates, and wherein a number of substrates equals a number of leafs.

10. The configurable Clos network of claim 9, wherein each of the configurable switches comprises a mechanism that opens or closes a bi-directional signal path between a leaf and a spine.

11. The configurable Clos network of claim 10, wherein the configurable switches are programmed to couple each of the ports of each of the leafs to a port of each of the spines and to couple each of the ports of each of the spines to a port of each of the leafs.

12. A method for configuring a Clos network, comprising:
determining a number of leafs and a number of spines, each of the leafs and each of the spines having a number of ports; and
operating a switch to couple each of the ports of each of the leafs to at least one port of each of the spines and to couple each of the ports of each of the spines to at least one port of each of the leafs,
wherein the switch comprises an optical switch, and
wherein the optical switch comprises two-sided moveable mirrors,
wherein in a first position, a movable two-sided mirror directs a first signal from a leaf output to a spine input and a second signal from a spine output to a leaf input.

13. The method of claim 12, wherein the number of leafs is less than the number of ports in a leaf, and the number of spines equals the number of leafs.

* * * * *